United States Patent Office 2,929,797
Patented Mar. 22, 1960

2,929,797

CONDENSATION PRODUCTS OF ALDEHYDES AND N,N'-DIALKYL PHENYLENEDIAMINES AND THEIR USE IN RUBBER

Harry E. Albert, Akron, Ohio, assignor to The Firestone Tire & Rubber Company, Akron, Ohio, a corporation of Ohio No Drawing. Application November 1, 1955
Serial No. 544,358

17 Claims. (Cl. 260—45.9)

This invention relates to aldehyde condensation products of N,N'-dialkyl o- and p-phenylenediamines, their preparation and their use as antiozonants in rubber.

The aldehydes used in producing the condensation products are aliphatic mono-aldehydes which contain 1 to 9 carbon atoms. They may be hydroxy-substituted, as in aldol. Thus the aldehydes include:

Formaldehyde
Acetaldehyde
Propionaldehyde
Acrolein
Crotonaldehyde
The butyraldehydes
Aldol
Paraldehyde
The heptaldehydes
The nonaldehydes In the dialkyl phenylenediamines which may be used in the reaction, each alkyl group contains 1 to 12 carbon atoms. The following are illustrative:

o- AND p-PHENYLENEDIAMINES

N,N'-dimethyl-
N,N'-diisopropyl-
N,N'-di-sec-butyl-
N,N'-di-(1-methylheptyl)-
N,N'-didodecyl-
N-methyl-N'-undecyl-
N-ethyl-N'-hexyl-
N-isopropyl-N'-sec-butyl-
N-methyl-N'-sec-butyl- Oxygen and ozone both have a harmful effect on rubber, but the effect of each is different, and compounds which inhibit or prevent the harmful effect of one are not necessarily effective in stopping or retarding the harmful effect of the other.

Crabtree and Kemp in an article in Industrial and Engineering Chemistry, vol. 38, starting at page 278 (1946), explain the difference in the action of oxygen and ozone. The light-catalyzed oxidation which occurs during outdoor exposure forms a skin and crazed appearance over the exposed surface of the rubber. Ozone, however, even in very low concentration, induces cracking in rubber, but only if the rubber is stretched. (C. H. Leigh-Dugmore, Rubber Age and Synthetics, November and December 1952.) The cracks are perpendicular to the direction of stretch. Such cracking can occur in the absence of light. Compounds which inhibit the action of ozone on rubber are referred to herein as antiozonants.

Tires are stressed when inflated. While a tire is at rest it is stretched statically, and on a moving vehicle it is stretched dynamically, i.e., it undergoes alternating stretching and relaxing. Some of the antiozonants are more effective in static tests and others are more effective in dynamic tests. Antiozonants which are effective under both conditions will be desired for tires, but for other rubber products an antiozonant which does not meet both tests may be used.

The inhibiting effect of the antiozonants of this invention on rubber was determined by treatment of unaged, cured stocks with air of controlled ozone content in specially designed equipment, and also by outdoor exposure to natural weathering. The tests were conducted with one-half inch dumbbell samples of approximately 100 gauge thickness. The special apparatus for testing with air of controlled ozone content, and the method of testing therein are described in the articles by Ford and Cooper, appearing in India Rubber World for September and October 1951, entitled "A Study of the Factors Affecting the Weathering of Rubber-Like Materials—I and II." The following tables refer to tests in which the ozone concentration was maintained at 60 parts per 100,000,000 of air. Two types of tests were conducted. In one type, called the dynamic test, the sample was repeatedly stretched between the limits of 0 and 20 percent elongation at the rate of 108 cycles per minute. In the other type of test, the static test, the samples were stretched at 12.5 percent elongation throughout the test. On completion of each test the number and size of the cracks in each sample were compared visually with the number and size of the cracks in a blank strip from the same masterbatch which contained no antiozonant and which was cured and tested at the same time as the test sample. The number of cracks was reported on an arbitrary scale as follows: "none," "very few" (or "v. few"), "few," "moderate," "moderate-to-numerous" (or "mod.-num."), and "numerous." The size of the cracks was reported according to an arbitrary scale as follows: "very slight" (or "v. sl."), "slight," "moderate," "moderately severe," and "very severe."

In all of the reported tests 2.0 parts by weight of an antiozonant were added to the masterbatch for each 100 parts of rubber present. The reported results include data on the tensile properties of the cured rubber stocks before and after aging in an oven under the conditions stated in the tables. The modulus and tensile strength are given in pounds per square inch, and the elongation is reported as percent of stretch at the break. These data are included to show that the antiozonants have no substantial deleterious effect upon the cure or upon the aging of the cured stocks.

The antiozonants are effective in the vulcanizates of both natural and synthetic rubbers, as, for example, those produced by polymerizing a conjugated diene such as 1,3-butadiene (or hydrocarbon homologue thereof) or co-polymerizing such a diene with a vinyl monomer as, for example, styrene, acrylonitrile, methacrylonitrile, or an ester of vinyl alcohol, an ester of acrylic or methacrylic acid, vinylpyridine, vinylcarbazole or other low-molecular-weight vinyl monomer. Such rubbers will be referred to herein as natural and synthetic hydrocarbon-diene rubbers.

The rubber may be vulcanized with sulfur or a sulfur donor or with a cross-linking agent such as a dithiol, nitro- or nitroso-compound, etc. Known vulcanization accelerators are useful in speeding up the vulcanization process and operative herein, especially the relatively active accelerators including the thiazole sulfenamides, e.g., N-cyclohexyl-2-benzothiazolesulfenamide, thiazoline sulfenamides, thiocarbamyl sulfenamides, mercaptothiazoles, mercaptothiazolines, thiazolyl mono- and di-sulfides, the N,N-disubstituted dithiocarbamates, the thiuram sulfides, the xanthogen sulfides, and metallic salts of mercaptothiazoles or mercaptothiazolines or dithiocarbamic acids.

One or more accelertor activators are often used with any of the accelerators mentioned, and such activators include the various derivatives of guanidine known in the rubber art, amine salts of inorganic and organic acids, various amines themselves, and alkaline salts such as sodium acetate and the like, as well as other activators known in the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butylxanthate, zinc ethylxanthate, zinc salt of mercaptobenzothiazole, zinc dimethyldithiocarbamate, and zinc dibutylidithiocarbamate. Although vulvanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra-accelerator by allowing the film to remain at room temperature for several hours or a few days.

It is well known that aldehydes are capable of reacting with the hydrogen atoms of aromatic amines on a nitrogen atom or on a ring position. (Miller, J. G., and Wagner, E. C., J. Am. Chem. Soc., 54, 3698 (1932).) Hence in the case of N,N'-dialkyl-p-phenylenediamines the hydrogen atoms on the two nitrogen atoms and the nuclear hydrogen atoms are those which would be involved in a reaction with an aldehyde. The probable result is the formation of methylene or substituted methylene bridges attached to these reaction sites which have the effect of increasing molecular weight and decreasing volatility. The presence of some methylol or substituted methylol structures in the reaction products is also possible.

In view of the above discussion it is apparent that the amount of aldehyde employed in the reaction could range from 0.5 mole per mole of N,N'-dialkylphenylenediamine to a theoretical maximum of $n/2$ moles, where $n$ is the number of reactive hydrogen atoms in the N,N'-dialkylphenylenediamine molecule. However, the maximum amount of aldehyde which would be desirable would be closer to 1.0 mole of aldehyde per mole of N,N'-dialkylphenylenediamine because the use of the theoretical maximum of aldehyde in many cases would probably lead to inactive products.

The antiozonant activity of N,N'-dialkyl-o- and p-phenylenediamines is well established. Compounds of this class having lower alkyl groups, such as N,N'-di-sec-butyl-p-phenylenediamine, are somewhat volatile and are very toxic in that they are capable of causing extreme skin sensitization. Volatility of a rubber compounding ingredient is always objectionable because of losses during the stock mixing and curing and because of continuing loss during the life of the vulcanized rubber article. However, these losses are especially objectionable when the compound in question possesses a high degree of toxicity. The aldehyde condensation products of this invention are relatively free from these objections. Compared to the parent N,N'-dialkyl-p-phenylenediamine, the aldehyde condensation products are less volatile and are considerably less toxic and, therefore, are more satisfactory as antiozonants.

*Example 1*

Twenty-two grams (0.1 mole) of N,N'-di-sec-butyl-p-phenylenediamine and 4.0 g. (0.055 mole) of butyraldehyde were heated on a steam bath for one day. Toluene was added and on refluxing water was removed in an overhead trap. On removal of the toluene, there was obtained 22.5 g. of a brown liquid condensation product of the aldehyde and amine.

*Example 2*

Twenty-two grams (0.1 mole) of N,N'-di-sec-butyl-p-phenylenediamine and 5.0 g. (0.057 mole) of aldol were heated overnight on a steam bath, taken up in toluene to dry and then heated to 150° C. Twenty-five grams of a brown liquid were produced, which was the condensation product of aldol and the amine.

The foregoing condensation products are illustrative. Thus, one might react 1 mole of acetaldehyde with 1 mole of N,N'-diethyl-o- or p-phenylenediamine, or .75 mole of propionaldehyde with 1 mole of N,N'-diisopropyl-o- or p-phenylenediamine, or .5 mole of formaldehyde with 1 mole of N,N'-di-dodecyl-o- or p-phenylenediamine. Catalysis by acid or alkali can be used, but usually is not necessary.

The condensation products of the examples were separately tested in a synthetic rubber stock containing rubber copolymer of butadiene and styrene, known more generally as GR–S. The stocks were each tested against a blank. The physical properties were determined, before and after aging, as well as the effect of ozone. The masterbatch to which the test materials and known antiozonant were separately added was compounded as follows:

| | Parts by weight |
|---|---|
| GR–S | 100 |
| Sulfur | 1.7 |
| Black | 45. |
| Stearic acid | 2.5 |
| Zinc oxide | 2.4 |
| Softener | 6.6 |
| Accelerator | 1.2 |
| Total | 159.4 |

All stocks were cured 80 minutes at 280° F. The results of the test follow.

TABLE 1

| | Blank | Test | Control |
|---|---|---|---|
| Masterbatch | 159.4 | 159.4 | 159.4 |
| Condensation product of Example 1 | | 2. | |
| N,N' - di - sec - butyl - p-phenylenediamine | | | 2. |
| Total | 159.4 | 161.4 | 161.4 |
| Physical Properties: | | | |
| Normal— | | | |
| 300% Modulus | 925 | 800 | 875. |
| Tensile Strength | 3,525 | 3,400 | 3,475. |
| Percent Elongation | 605 | 615 | 620. |
| Aged 2 Days in Oven at 212° F.— | | | |
| 300% Modulus | 2,125 | 1,850 | 1,925. |
| Tensile Strength | 2,675 | 3,225 | 3,025. |
| Percent Elongation | 350 | 440 | 405. |
| Ozone Effects (4 hrs., 60 p.p.h.m., 95° F.): | | | |
| Static— | | | |
| Size | Mod. Sev | None | None. |
| Frequency | Mod.-Num | None | None. |
| Dynamic— | | | |
| Size | Slight | None | None. |
| Frequency | Numerous | None | None. |

TABLE 2

| | Blank | Test |
|---|---|---|
| Masterbatch | 159.4 | 159.4 |
| Condensation product of Example 2 | | 2 |
| N,N'-di-sec-butyl-p-phenylenediamine | | |
| Total | 159.4 | 161.4 |
| Physical Properties: | | |
| Normal— | | |
| 300% Modulus | 900 | 800. |
| Tensile Strength | 3,200 | 3,550. |
| Percent Elongation | 595 | 625. |
| Aged 2 Days in Oven at 212° F.— | | |
| 300% Modulus | 2,000 | 1,775. |
| Tensile Strength | 2,250 | 2,775. |
| Percent Elongation | 320 | 395. |
| Ozone Effects (4 hrs., 60 p.p.h.m., 95° F.): | | |
| Static— | | |
| Size | Severe | Slight. |
| Frequency | Moderate | V. Few. |
| Dynamic— | | |
| Size | Moderate | V. Slight. |
| Frequency | Numerous | V. Few. |

A GR-S tread stock containing no antiozonant along with similar stocks containing 2 parts of the N,N-di-sec-butyl-p-phenylenediamine-aldehyde condensation products of Examples 1 and 2 and unreacted N,N-di-sec-butyl-p-phenylenediamine, respectively, were subjected to natural weathering in Akron. For this test .100 gauge dumbbell strips were stretched to a 12½ percent elongation on wooden racks. After 28 days the stocks containing no antiozonant were severely cracked. No cracking appeared on the stocks which contained the reaction product of Example 1, the reaction product of Example 2, or N,N'-di-sec-butyl-p-phenylenediamine. Hence each of the test materials was an excellent antiozonant in this natural exposure test.

The reported results are also illustrative, being merely suggestive of the value of these antiozonants.

The invention is defined by the claims which follow.

What I claim is:

1. Condensation products of 1 to 2 moles of an aliphatic mono-aldehyde and substantially 2 moles of N,N'-dialkyl-p-phenylenediamine, produced by heating the aldehyde and diamine to a temperature between that reached on a steam bath and 150° C., each alkyl group of which phenylenediamine contains 1 to 12 carbon atoms, and the aldehyde contains 1 to 9 carbon atoms.

2. The process of producing the condensation products of claim 1 which comprises heating the aldehyde and phenylenediamine at a temperature between that produced on a steam bath and 150° C.

3. Vulcanized rubber containing a relatively small amount of a condensation product of claim 1, the rubber being from the class consisting of natural and synthetic hydrocarbon-diene rubbers.

4. Vulcanized rubber copolymer of butadiene and styrene which contains a relatively small amount of a condensation product of claim 1.

5. The process which comprises vulcanizing rubber in the presence of a relatively small amount of a condensation product of claim 1, the rubber being from the class consisting of natural and synthetic hydrocarbon-diene rubbers.

6. Condensation product of 1 to 2 moles of an aliphatic mono-aldehyde containing 1 to 9 carbon atoms and substantially 2 moles of N,N'-di-sec-butyl-p-phenylenediamine produced by heating the aldehyde and diamine to a temperature between that reached on a steam bath and 150° C.

7. The process of producing a condensation product of claim 6 which comprises heating the aldehyde with the phenylenediamine at a temperature between that produced on a steam bath and 150° C.

8. Sulfur-vulcanized rubber copolymer of butadiene and styrene which contains a relatively small amount of the condensation product of claim 6.

9. The method which comprises sulfur-vulcanizing rubber in the presence of a relatively small amount of the condensation product of claim 6, the rubber being from the class consisting of natural and synthetic hydrocarbon-diene rubbers.

10. Condensation product of 1 to 2 moles of butyraldehyde and substantially 2 moles of N,N'-di-sec-butyl-p-phenylenediamine produced by heating the aldehyde and diamine to a temperature between that reached on a steam bath and 150° C.

11. The process of producing the condensation product of claim 10 which comprises heating 1 to 2 moles of butyraldehyde and substantially 2 moles of N,N'-di-sec-butyl-p-phenylenediamine at a temperature between that produced on a steam bath and 150° C.

12. Sulfur-vulcanized rubber copolymer of butadiene and styrene which contains a relatively small amount of the condensation product of claim 10.

13. The process of vulcanizing rubber which comprises sulfur-vulcanizing the same in the presence of a relatively small amount of the condensation product of claim 10, the rubber being from the class consisting of natural and synthetic hydrocarbon-diene rubbers.

14. Condensation product of 1 to 2 moles of aldol and substantially 2 moles of N,N'-di-sec-butyl-p-phenylenediamine produced by heating the aldehyde and diamine to a temperature between that reached on a steam bath and 150° C.

15. The method of producing the condensation product of claim 14 which comprises heating 1 to 2 moles of aldol and substantially 2 moles of N,N'-di-sec-butyl-p-phenylenediamine at a temperature between that produced on a steam bath and 150° C.

16. Sulfur-vulcanized rubber copolymer of butadiene and styrene which contains a relatively small amount of the condensation product of claim 14.

17. The process of vulcanizing rubber which comprises sulfur-vulcanizing the same in the presence of a relatively small amount of the condensation product of claim 14, the rubber being from the class consisting of natural and synthetic hydrocarbon-diene rubbers.

References Cited in the file of this patent

UNITED STATES PATENTS

| Number | Name | Date |
|---|---|---|
| 1,906,940 | Ter Horst | May 2, 1933 |
| 2,218,661 | Semon | Oct. 22, 1940 |
| 2,263,013 | Scott | Nov. 18, 1941 |
| 2,323,948 | Von Bramer et al. | July 13, 1943 |
| 2,353,591 | Scott | July 11, 1944 |
| 2,496,596 | Moyer et al. | Feb. 7, 1950 |
| 2,536,983 | Owen | Jan. 2, 1951 |
| 2,705,224 | Hill et al. | Mar. 29, 1955 |

FOREIGN PATENTS

| 454,288 | Great Britain | Sept. 28, 1936 |